Patented Sept. 4, 1945

2,383,977

UNITED STATES PATENT OFFICE 2,383,977

α - ANILINE - N - d - RIBOFURANOSIDE AND PROCESS FOR THE MANUFACTURE THEREOF

John Lee, Essex Fells, and Leo Berger, Nutley, N. J., assignors to Hoffmann-La Roche, Inc., Nutley, N. J., a corporation of New Jersey No Drawing. Application September 30, 1943, Serial No. 504,446

4 Claims. (Cl. 260—211)

Our invention relates to a new stable derivative of ribose, α-aniline-N-d-ribofuranoside, having the probable formula:

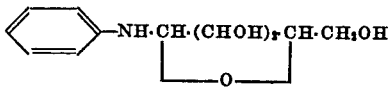

and to a process of making it.

In our copending application, Ser. No. 504,442, filed of even date herewith, in which we are co-inventors, we have described in Example 1 the condensation of d-ribose with aniline in aqueous alcoholic solution at a temperature of 25° C. within a pH range of from 2 to 8. There results a compound having the following characteristics:

M. P. 125–7°, $[\alpha]_D^{24°} = +63.4° \to +48.6°$ (c=1.0 in pyridine).

We have now discovered that on refluxing in a solvent, such as alcohol, this compound is transformed into a new N-riboside having the following characteristics:

M. P. 138–40° C., $[\alpha]_D^{27°} = +176.5° \to +156.6°$ (c=3.0 in pyridine).

We have found that this new derivative possesses good stability and excellent crystallization capacity, by virtue of which properties it is a suitable intermediate, for example, in the manufacture of ribose from crude reaction mixtures containing it. In this respect, it is superior to the hitherto known α-3,4-dimethylaniline-N-d-ribofuranoside of the formula:

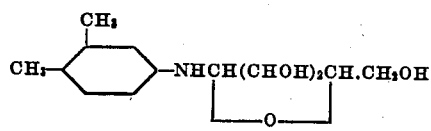

described by Kuhn and Birkofer, Ber. 71, 261 (1938), since the latter is relatively unstable and decomposes in a short time.

In our copending application, Ser. No. 504,442, we have also described the condensation product of crude d-ribose obtained at room temperature with 3,4-dimethylaniline in solution which has the following characteristics:

$[\alpha]_D^{25°} = +94.5° \to +53.0°$ (c=1.0 in pyridine), M. P. 110–12° C.

We have discovered that this material on refluxing in alcohol is transformed quantitatively into the above described α-3,4-dimethyl-N-d-ribofuranoside of Kuhn and Birkofer.

We consider the compound of Example #1 of our aforementioned copending application, Ser. No. 504,442, to have the structure of a pyranoside of the probable formula:

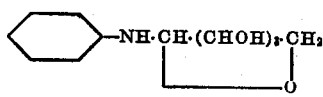

The new α-aniline-N-d-ribofuranoside can also be prepared by refluxing in a solvent, such as alcohol, a complex of this α-aniline-N-d-ribopyranoside with soluble salts of alkali metals or ammonium, such as described in our aforementioned copending application, Ser. No. 504,442, where it is pointed out that these complexes separate from aqueous alcoholic solutions and contain the pentoside in a loose combination with the alkali metal salt used, or the furanoside can be made directly by refluxing an alcoholic solution containing ribose with aniline.

Our new compound can be hydrolyzed to yield ribose in exceptionally good yield by the process described in copending application, Ser. No. 504,443, filed of even date herewith in which we are co-inventors. Hydrolysis can be performed by refluxing our compound in alcohol or water under suitable conditions, such as the addition of an equivalent or slight excess of benzaldehyde until hydrolysis is complete, removing the benzal derivative of the amine and evaporating the solution in vacuo. The amine may also be removed, for example, by steam distillation of our furanoside in water. A small quantity of a volatile lower fatty acid, such as formic, acetic or propionic acid, or traces of a strong acid, may be present during the hydrolysis, and the use of a non-oxidizing atmosphere is advantageous.

On the other hand, the aforementioned α-3,4-dimethylaniline-N-d-ribofuranoside of Kuhn and Birkofer yields only dark, tarry solutions on hydrolysis under the conditions which we employ for the α-aniline-N-d-ribofuranoside.

The following examples illustrate our invention.

Example 1

10 g. α-aniline-d-ribopyranoside (M. P. 125–7°; $[\alpha]_D^{24°\ C.} = +63.4° \to +48.6°$)

prepared by the reaction of aniline and crude ribose in cold alcoholic solution, is dissolved in 80 cc. boiling absolute alcohol, refluxed for 1 hour and cooled. Crystallization occurs, and, after washing with cold absolute alcohol and ether, the yield is 9.9 g. of α-aniline-N-d-ribofuranoside. M. P. 138-40°. [α]$_D^{27°C.}$=+176.5°→+156.6°.

*Example 2*

15.0 g. crude ribose is dissolved in 150 cc. alcohol. 10 g. aniline is added, stirring thoroughly, and the mixture refluxed for 2 hours. On cooling, α-aniline-N-d-ribofuranoside, with the characteristics described in Example 1, crystallizes out.

In the appended claims, by the term "α" we mean a riboside which on muta-rotating becomes more negative. By the term "solvent" for the following reaction we mean, for example, alcohol, aqueous alcohol, dioxan, methyl, isopropyl alcohol, and the like. In the above description, in assigning names to aniline ribosides we have done so on the basis of the best information at our disposal, but intend that our invention relates to the compound of the characteristics given without any limitations as to its probable constitution.

In the above description, we have given the melting point and optical rotation of our new compound, and believe these to be accurate, but it is understood that a slight degree of impurity will cause minor deviations from these characteristics. Moreover, the compound has a tendency to crystallize with varying amounts of solvent of crystallization which, accordingly, modifies these characteristics.

What we claim is:

1. α-Aniline-N-d-ribofuranoside.
2. Method for the manufacture of α-aniline-N-d-pentofuranoside, which comprises refluxing α-aniline-N-d-pentopyranoside in an indifferent solvent.
3. Method for the manufacture of α-aniline-N-d-pentofuranoside, which comprises refluxing α-aniline-N-d-pentopyranoside in alcohol.
4. Method for the manufacture of α-aniline-N-d-ribofuranoside, which comprises refluxing α-aniline-N-d-ribopyranoside in alcohol.

JOHN LEE.
LEO BERGER.